Oct. 30, 1923.
F. A. PREUSS
SEED CORN SHELLER
Filed Nov. 21, 1922
1,472,672
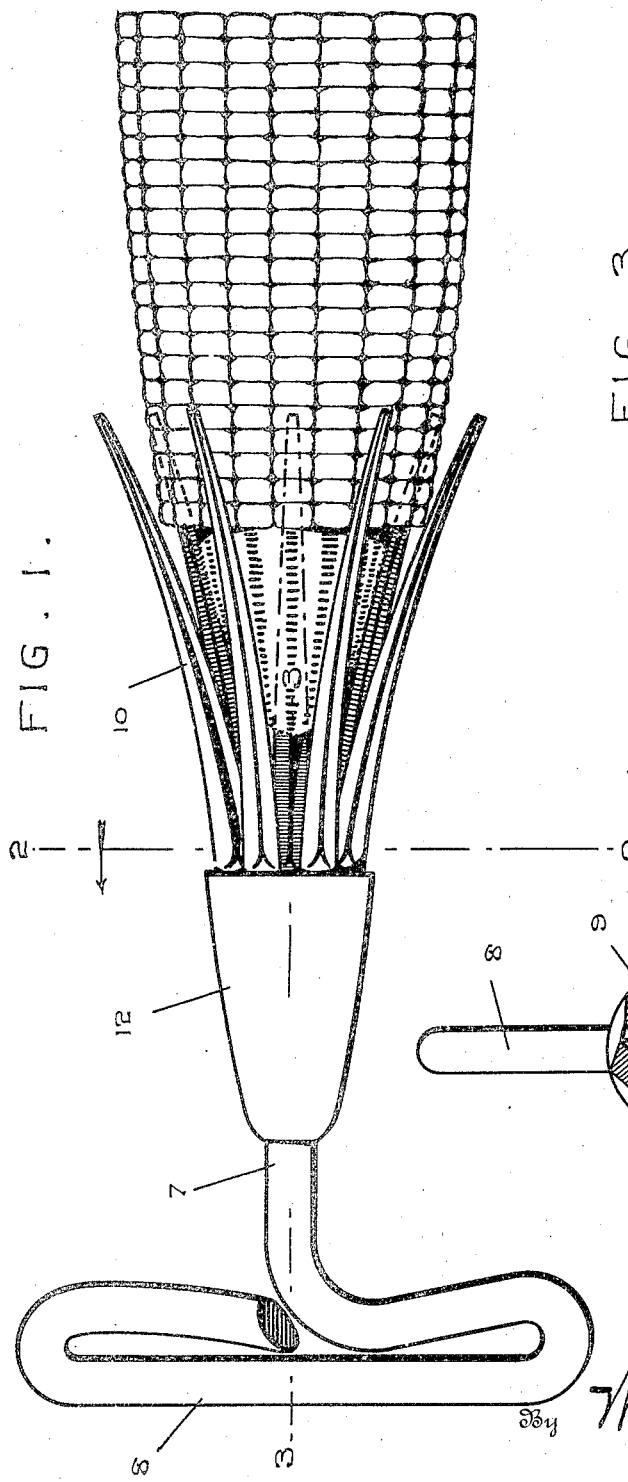
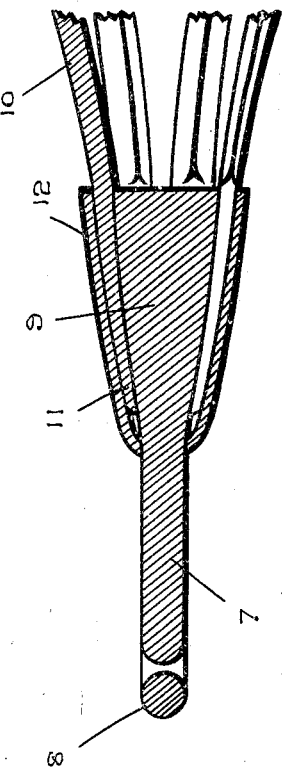
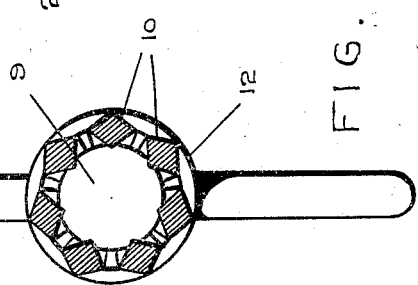
Inventor:
F. A. PREUSS,
By W. J. FitzGerald & Co.
Attorney.

Patented Oct. 30, 1923.

1,472,672

UNITED STATES PATENT OFFICE.

FRED A. PREUSS, OF HUMPHREY, NEBRASKA.

SEED-CORN SHELLER.

Application filed November 21, 1922. Serial No. 602,384.

*To all whom it may concern:*

Be it known that I, FRED A. PREUSS, a citizen of the United States, residing at Humphrey, in the county of Platte and State of Nebraska, have invented certain new and useful Improvements in Seed-Corn Shellers; and I do hereby declare the following to be a full, clear, and exact description of the invention, such as will enable others skilled in the art to which it appertains to make and use the same.

The present invention relates to a hand sheller for removing from the end portions of ears of seed corn, the smaller or undesirable kernels, leaving the larger or preferred kernels for seed, and the invention aims to provide a novel and improved implement of that kind whereby the shelling of the end portions of the ears of the seed corn can be done quickly and conveniently by hand.

Another object is the provision of such a seed corn sheller comprising a novel construction and assemblage of the component elements, whereby the device is simple and easy to manufacture, as well as efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the device as in use.

Fig. 2 is a cross section on the line 2—2 of Fig. 1.

Fig. 3 is a longitudinal section of the line 3—3 of Fig. 1.

The implement comprises a short axial shank or stem 7, formed from a rod of iron or sutable metal, and having one terminal bent to form a T-handle 8 for holding the handle in one hand conveniently.

The shank or stem 7 is formed at its other end with a tapered enlargement or portion 9, and an annular set of shelling prongs or tines 10 project beyond such end of the shank. Said prongs have the tangs 11 overlapping the enlargement or portion 9 of the shank, and a tapered sleeve 12 is fitted around said tangs 11, with its rear smaller end embracing the shank 7. The enlargement 9 of the shank, tangs 11 and sleeve 12 are secured together by soldering, welding or the like, to unite them into one integral structure. The prongs or tines 10 are thus securely fastened to the shank or stem.

The prongs 10 are tapered so as to be of gradually reducing cross-section from their basal portions to their free ends, and said prongs diverge from one another along curved lines, so as to receive the end of the ear of corn, as seen in Fig. 1. The prongs are of diamond-shaped or angular cross-section, with sharp corners or edges presented inwardly toward the center or axis of the device, as seen in Fig. 2, to engage the kernels.

In using the implement, the end of the ear of corn is inserted within the pronged end of the implement, with the ear of corn and implement in alinement or coaxial, the implement being held in one hand and the ear of corn in the other, and being rotated relatively to one another. The prongs or tines 10 engaging the kernels on the end portion of the cob will strip such kernels from the cob, and the smaller kernels can thus be conveniently removed from the cob. Both ends of the ear of corn can be freed of the smaller and undesirable kernels, and such kernels can be removed for different distances from the ends of the ears, leaving only the preferred kernels on the cobs for seed. The undesirable or inferior kernels are thus removed from the cobs.

Having thus described the invention, what is claimed as new is:—

A seed corn sheller having diverging shelling prongs disposed around the axis of the sheller and provided with sharp corners presented inwardly toward said axis to engage the kernels of an ear of corn inserted between said prongs, said prongs being curved away from one another and tapering toward their free ends.

In testimony whereof I have signed my name to this specification.

FRED A. PREUSS.